United States Patent [19]
DeVita

[11] 3,891,362
[45] June 24, 1975

[54] APPARATUS FOR MOLDING FOAMED THERMOPLASTIC ARTICLES

[75] Inventor: William R. DeVita, Matthews, N.C.

[73] Assignee: Structural Foam Products, Inc., Pineville, N.C.

[22] Filed: May 30, 1973

[21] Appl. No.: 365,079

Related U.S. Application Data

[63] Continuation-in-part of Ser. No. 152,612, June 14, 1971, Pat. No. 3,746,492.

[52] U.S. Cl................ 425/4 R; 425/159; 425/244; 425/248; 264/50; 425/DIG. 817 R
[51] Int. Cl.............................................. B29d 27/04
[58] Field of Search............ 425/4 R, 146, 200, 244, 425/245, 248, DIG. 817, 159; 264/50, 51, DIG. 83

[56] References Cited
UNITED STATES PATENTS

| | | | |
|---|---|---|---|
| 2,478,013 | 8/1949 | Roddy | 425/244 UX |
| 3,437,722 | 4/1969 | Cronin et al. | 425/4 X |
| 3,543,348 | 12/1970 | Nussbaum | 425/4 |
| 3,671,159 | 6/1972 | Greenberg et al. | 425/248 X |
| 3,746,492 | 7/1973 | DeVita | 425/245 R X |
| 3,763,293 | 10/1973 | Nussbaum | 425/817 R X |

FOREIGN PATENTS OR APPLICATIONS 2,054,972  5/1971  France

*Primary Examiner*—R. Spencer Annear
*Attorney, Agent, or Firm*—Parrott, Bell, Seltzer, Park & Gibson

[57] ABSTRACT

A method and apparatus for molding foamed thermoplastic articles and including an extruder for melting a thermoplastic material and for extruding the molten thermoplastic material therefrom, a plurality of expansible and contractible accumulation chambers connected to the extruder for receiving material therefrom, a mixer positioned between the extruder and accumulation chambers for receiving the melted material and mixing a gaseous blowing agent therewith, a mold for receiving the mixture from the accumulation chambers, and means for establishing communication between each of the accumulation chambers and the mold. The expansible and contractible accumulation chambers each include a translatable piston, and pressure means for applying an expansion resisting first force on each piston during receipt of the mixture therein to maintain a pressure in the chambers sufficient to preclude premature foaming of the mixture. In order to rapidly force the mixture from each of the accumulation chambers into the mold, the pressure means is adapted to selectively apply a second force of greater intensity than the first force on each of the pistons substantially concurrently with communication being established between the accumulation chambers and the mold. Means are provided for independently adjusting the upper limit of translation for each piston whereby the volume of the accumulation chambers may be varied.

16 Claims, 4 Drawing Figures

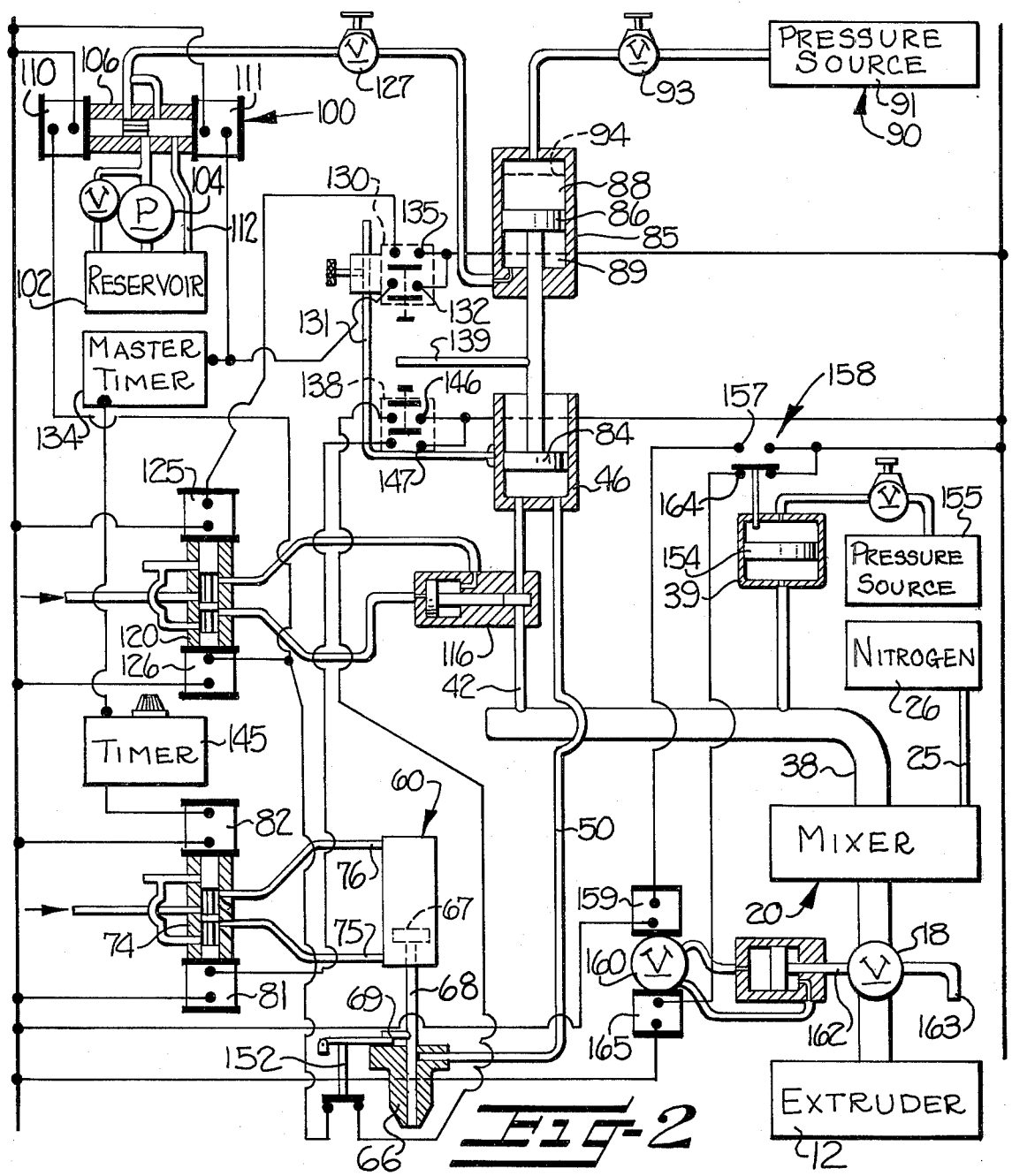
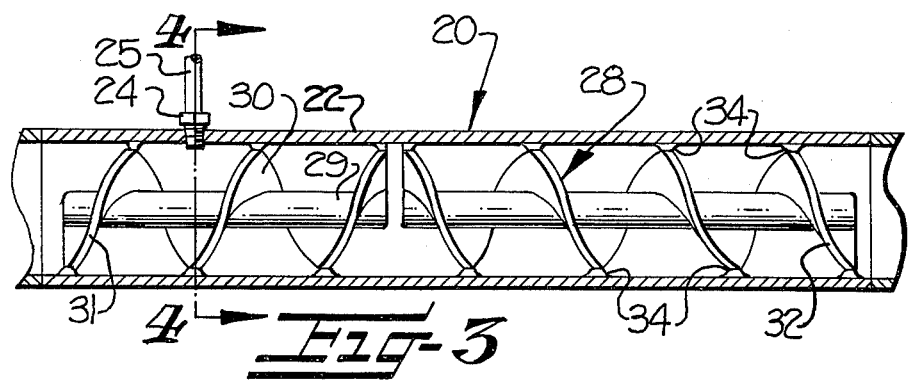
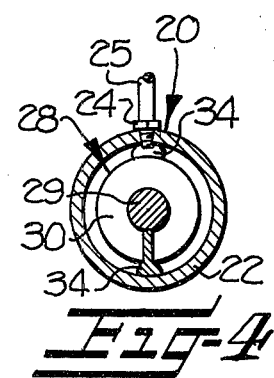

APPARATUS FOR MOLDING FOAMED THERMOPLASTIC ARTICLES

The present application is a continuation-in-part of application Ser. No. 152,612 filed June 14, 1971, and now U.S. Pat. No. 3,746,492.

The present invention relates to a method and apparatus for molding foamable thermoplastic materials.

It has been proposed to mold a variety of products utilizing foamable thermoplastic materials by an injection molding technique. More particularly, foamed thermoplastic products have been molded by a process which includes initially melting and mixing a thermoplastic material and a gaseous blowing agent, such as nitrogen, in an extruder. From the extruder, the mixture enters an expanding accumulation chamber having a translatable piston adapted to maintain the mixture under high pressure. When a predetermined charge has been received in the accumulation chamber, a valve to the mold is opened permitting the pressurized mixture to be forced from the accumulation chamber into the mold, the mold being maintained at a reduced or atmospheric pressure. Normally, only enough plastic material to fill a portion of the mold is delivered by the accumulation chamber since the blowing agent expands the material to thereby fill the mold.

Most thermoplastic materials melt at a temperature of about 350°F. or above, and to preclude the premature foaming of the mixture at these high temperatures the extruder and accumulation chamber must maintain the mixture under pressure on the order of about 500 psi. In actual practice however, the extruder and accumulation chamber normally maintain the mixture under a much higher pressure of about 1,500–3,000 psi to assure sufficiently rapid discharge from the accumulation chamber into the mold.

Parts molded by the above process present several advantages over conventional plastic parts molded from non-foaming material in that the former are essentially stress free, light in weight, and yet they have comparable strength and toughness. However, while the finished product has been generally satisfactory, the process itself has been a source of numerous production difficulties which have severely limited its utility and efficiency. In particular, since the plastic is maintained at a pressure of about 1,500–3,000 psi in the extruder, the nitrogen blowing agent must be injected at a similarly high pressure in order to get the nitrogen into the extruder and thoroughly mixed with the plastic. To obtain these pressures, either highly pressurized bottles or independent compressors must be employed, both of which are undesirable from a cost and efficiency point of view. In an attempt to alleviate this problem, it has been proposed to design the auger or feed screw in the extruder to provide a low pressure area at the entrance port of the blowing agent. This is normally accomplished by reducing the root diameter of the auger flutes, but this in turn significantly increases the cost of this component.

The required high pressure which must be maintained in conventional systems presents an additional problem in that there often is a considerable amount of leakage in the entire system between the extruder and the mold. Also, the rapid expansion of the highly pressurized blowing agent in the mold often causes turbulence in the mixture which in turn gives rise to wrinkles and areas of differing densities in the finished product.

A further difficulty in the conventional process for molding foamable thermoplastic products resides in the inability to satisfactorily distribute the charge from the accumulation chamber to more than one injection port. For example, in filling either multiple molds or a large unitary mold of complicated configuration, it is conventional to discharge the mixture from the accumulation chamber into a manifold for distribution into a series of parallel lines. Each line includes a manually adjustable metering valve such that the charge passing through that line and the associated injection port can be independently controlled. The difficulty in obtaining a proper balance under this system will be readily apparent, since any adjustment or variance in one metering valve will necessarily affect the amount of the charge passing through the other valves. In addition, a slight change in temperature, pressure or composition of the mixture can change the amount of the charge passing through the valves. Thus, a time consuming operation is required to initially set the various valves, and constant readjustment is required to make allowance for changing conditions.

In cases where a number of distribution lines are connected to a large unitary mold of complicated configuration, difficulty may also be encountered in botaining a proper distribution of the foamable material into all portions of the mold. More particularly, the material entering the mold through one line may block the travel of material entering the mold from another line such that a void is left at some point in the mold.

It is accordingly an object of the present invention to provide an improved method and apparatus for molding a foamable thermoplastic material which obviates the above noted disadvantages of the presently employed process.

It is a more specific object of the present invention to provide an apparatus for thoroughly mixing the plastic and blowing agent in an independent mixing chamber maintained at a relatively low pressure and positioned between the extruder and accumulation chamber.

It is another object of the present invention to provide a process of the described type wherein the nitrogen or other blowing agent may be dispensed into the melted plastic at a relatively low pressure, without the need for high pressurized bottles or an independent compressor, and while employing an extruder auger of conventional uncomplicated design.

It is a further object of this invention to provide a low pressure system for molding foamed thermoplastic articles wherein the above noted problem of turbulence in the mold is effectively alleviated.

It is another object of this invention to provide means for distributing an accumulated charge into a plurality of distribution lines which eliminates the conventionally employed metering valves and which further includes provision for independently and permanently adjusting the charge passing through each line.

It is still another object of the present invention to provide means for timing the entry of the charge from each of a plurality of distribution lines into the mold such that the flow of the material through the mold can be controlled to prevent the formation of voids.

These and other objects and advantages of the present invention are achieved in the embodiment of the invention illustrated herein by the provision of an apparatus which includes an extruder for melting and extruding a thermoplastic material, a plurality of expansible and contractible accumulation chambers connected to the extruder for receiving the mixture therefrom, a mixer positioned between the extruder and accumulation chambers for receiving the melted material and mixing a gaseous blowing agent therewith, mold means for receiving the mixture from the accumulation chambers, and means for establishing communication between each of the accumulation chambers and the mold means. The extruder is adapted to convey the mixture through the mixer and into the accumulation chambers under a pressure sufficient to preclude premature foaming, and the accumulation chambers each include a translatable piston adapted to selectively apply an expansion resisting pressure during receipt of the mixture therein and then a significantly increased pressure to rapidly force the same into the mold means upon communication being established between the accumulation chambers and mold means.

Some of the objects and advantages of the invention having been stated, others will appear as the description proceeds, when taken in connection with the accompanying drawings, in which FIG. 1 is a schematic representation of an apparatus for molding foamed thermoplastic articles which incorporates the present invention;

FIG. 2 is an enlarged schematic representation of one of the accumulation chambers shown in FIG. 1;

FIG. 3 is a sectional elevation view of the mixer of the present invention;

FIG. 4 is a sectional end view of the mixer taken substantially along the line 4—4 of FIG. 3.

Figure 1:
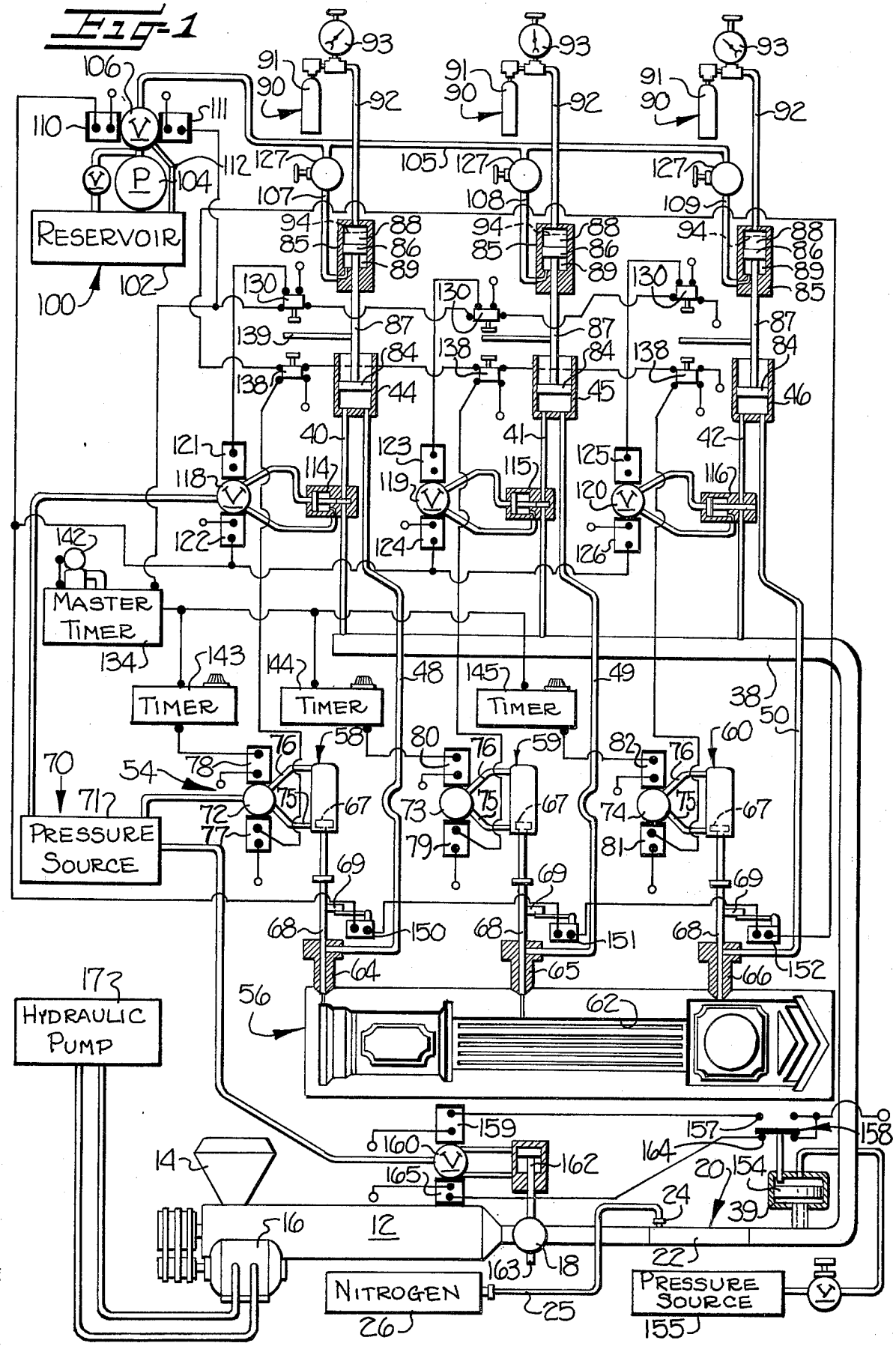

Referring more specifically to the drawings, an apparatus for molding foamed thermoplastic articles is schematically illustrated in FIG. 1, and includes an extruder 12 of conventional design for melting the thermoplastic material and conveying the same under pressure along a path of travel as hereinafter further described. The extruder includes a hopper 14 for receiving a granulated thermoplastic material, heating means (not shown) for elevating the temperature of the granules to melt the same within the extruder, and an internal auger (not shown) rotatable by the motor 16 to convey the melted mixture under pressure toward the right end of the extruder as seen in FIG. 1. The pressure of the extruded mixture is relatively low, e.g., about 500 psi or less, but is sufficient to preclude premature foaming as further described below. As illustrated, the motor 16 is hydraulic so as to facilitate the starting and stopping thereof under full load as hereinafter further explained and it is powered by a conventional hydraulic pump 17.

A dump valve 18 is positioned in communication with the open right end of the extruder as shown in FIG. 1 for the purposes hereinafter further described, and a mixer 20 is positioned downstream of the dump valve 18. The mixer 20 is adapted to receive the pressurized and melted thermoplastic material and thoroughly mix the same with a gaseous blowing agent. As best seen in FIG. 3, the mixer comprises a tubular wall 22 defining a cylindrical internal passageway, and a port 24 extending through the wall 22 for admitting the blowing agent therethrough. More particularly, the port 24 is connected via the pipe 25 to a source of gaseous blowing agent, such as nitrogen bottles 26 which may be maintained at a suitable pressure, e.g., about 500 psi. This pressure should be somewhat higher than the pressure of the extruded mixture to cause the nitrogen to enter the mixer and be mixed with the thermoplastic material. As stated above, the pressure of the resulting mixture must be maintained at a level sufficient to preclude foaming, and a pressure of, for example, about 500 psi will be sufficient for this purpose in the case of most conventional thermoplastic materials and blowing agents.

Since conventional extruders are designed to run at relatively high pressures of about 1,500–3,000 psi as noted above, and since the pressure downstream of the extruder need be only about 500 psi with the present invention, there would be a substantial pressure drop between the extruder 12 and mixer 20 in those cases where a conventional extruder is employed.

The mixer 20 further includes an auger 28 fixedly positioned in the passageway. More particularly, the auger 28 comprises a central shaft 29 coaxially disposed in the passageway and a flange 30 helically disposed about the shaft, the flange 30 including a first portion 31 of one hand, and a second portion 32 of the opposite hand. Viewing FIG. 4 it will be observed that the flange 30 has a major diameter somewhat less than the internal diameter of the passageway to define a clearance between the periphery of the flange and the internal wall of the mixer. A number of spot welds 34 extend between the periphery of the flange and the mixer wall to fixedly mount the auger 38 therein.

In describing the operation of the mixer, it will be apparent that a first portion of the melted thermoplastic material entering from the left end as seen in FIG. 3 will be directed along a helical path defined by the auger flange portion 31, and a second portion of the material will be directed along a linear path between the periphery of the flange and the mixer to effect a thorough mixing of the melted thermoplastic material with the blowing agent entering at 24 as the material continues along the path of travel. It will also be noted that the second flange portion 32 of the mixer will direct a portion of the mixture along an oppositely directed helical path to further enhance the thorough mixing of the two materials.

From the mixer 20, the melted mixture of the thermoplastic material and blowing agent is conveyed into a distribution line 38 which communicates with a preliminary accumulation chamber 39 as hereinafter described, and with the parallel lines 40, 41 and 42 leading to the main accumulation chambers 44, 45, and 46 respectively. Independent discharge lines 48, 49, and 50 lead from the associated accumulation chamber, through the selective communication means 54, and into the mold means 56. More particularly, each of the discharge lines 48, 49, and 50 is controlled by valves 58, 59, 60 respectively, for establishing communication between the associated accumulation chamber and one of the injection ports 64, 65, and 66. As illustrated, these ports may lead into a single mold cavity 62 of relatively complicated configuration, or they may lead into a mold comprising three relatively small separate components (not shown).

Each of the valves 58, 59, 60 is of conventional construction, and includes a translatable piston 67 and depending rod 68 positioned to selectively block passage through the respective discharge lines. Each of the rods carries a transverse plate 69 for the purposes hereinafter set forth.

A pneumatic pressure system 70 is provided which includes an air pressure source 71, and each of the valves 58, 59, 60 is controlled by an individual four way valve 72, 73, 74 respectively, and connecting line 75 and 76 to selectively lift the pistons 67 to establish communication between the respective discharge line and mold, and to depress the pistons to close the communication. The valve 72 is controlled by the solenoids 77 and 78, the valve 73 by solenoids 79 and 80, and the valve 74 by solenoids 81 and 82.

Each of the accumulation chambers 44, 45 and 46 includes a first piston 84 translatable between a lowered position defining an unexpanded chamber and a raised position defining an expanded chamber. A cylindrical piston housing 85 is mounted adjacent each accumulation chamber and carries a second piston 86 mounted for coaxial and corresponding translation with the first piston 84 in the associated accumulation chamber, the two pistons being interconnected by the rod 87. The piston housing 85 defines a first area 88 above the second piston 86 and a second area 89 beneath the same.

A first pressure means 90 communicates with the first area 88 of each piston housing and is adapted to urge the first and second pistons downwardly under a relatively high pressure of, for example, about 2,500–4,000 psi. In the illustrated embodiment, each first pressure means 90 includes a bottle 91 of pressurized gas such as air or nitrogen, a pipe 92 communicating with the piston housing, and a guage 93 for observation by the operator of the apparatus. Also, a layer of oil 94 may be positioned above each of the pistons 86 to serve as a seal for the gas in the pressure system.

A second pressure means 100 communicates with the second area 89 of each housing to urge the first and second pistons 84 and 86 upwardly against the force of the means 90. More particularly, the system 100 includes a hydraulic fluid reservoir 102, pump 104, main distribution line 105 having a first valve 106 therein, and three secondary lines 107, 108, and 109 leading to the second area 89 of each housing 85. The valve 106 is controlled by the solenoids 110 and 111 between a first position wherein the pump 104 communicates with the line 105 to deliver pressurized fluid thereinto, and a second position wherein the line 105 communicates with the relief line 112 for dumping into the reservior 102. More particularly, actuation of solenoid 110 transfers the valve to its first position, and solenoid 111 transfers the valve to its second position. The pump is thus designed to selectively maintain an intermediate pressure of, for example, about 500–3,000 psi in the line 105. Each of the secondary lines 107, 108 and 109 includes a manually adjustable metering valve 127 for the purposes hereinafter set forth.

Each of the entrance lines 40, 41 and 42 leading from the distribution line 38 to the associated accumulation chamber includes a piston type valve 114, 115, and 116, respectively, for selectively establishing and terminating communication therethrough. Each of these valves is operatively controlled by a four-way pneumatic valve 118, 119 and 120 which are connected to the air pressure source 70. Each of the four-way valves includes a pair of controlling solenoids numbered 121-122, 123-124, and 125-126 respectively.

The automatic operation of the apparatus is controlled by a number of limit switches which are mounted in pairs adjacent each accumulation chamber as shown in FIGS. 1 and 2. In particular, each accumulation chamber carries an upper double pole switch 130 which is adjustably attached to a vertical rod 131 to thereby permit vertical adjustment with respect to the accumulation to the chamber as schematically shown in FIG. 2. The lower poles 132 of each switch 130 are connected in series such that closure of each switch 130 is required to actuate the solenoid 111 and timer 134 as further described below. The upper poles 135 of switches 130 independently actuate the associated solenoid 121, 123, or 125. When these solenoids are actuated, the associated valve 114, 115 or 116 is moved to the closed position. Solenoids 122, 124 and 126 are employed to reopen these valves as explained below.

A lower double pole switch 138 is mounted immediately below each switch 130, and a contact arm 139 is carried by the rod 187 so as to close one of these switches at each of the raised and lowered positions of the pistons 86 and 84. As will hereinafter become more apparent, the vertical positioning of the switch 130 along the rod 131 will effectively control the volume of mixture received in the associated accumulation chamber.

As noted above, the solenoid 111 and timer 134 are actuated upon all of the pistons reaching their raised positions and all of the switches 130 being closed. The timer 134 is a conventional electrical delay circuit of a type well known to those skilled in the art, and is designed to immediately energize the bell 142 to warn the operator of the impending discharge of the accumulation chambers, and to then acutate the solenoids 78, 80 and 82 after a short delay period of, for example, about one to ten seconds. An additional delay may be provided by the timers 143, 144, and 145 which control the solenoids 78, 80 and 82 respectively. These timers are individually controllable such that the sequence in which the solenoids are actuated may be preselected. The actuation of solenoids 78, 80 and 82 cause the valves 72, 73, and 74 to direct pressurized air through the lines 75 to substantially simultaneously raise the pistons 67 and thereby establish communication between the accumulation chambers 44, 45, and 46 and the mold cavity 62. The master timer 134 thus acts as a safety feature to give the operator warning of the impending discharge and to permit him to ensure that the mold is closed and ready to receive the charge. During this period of delay, the dump valve 18 may be opened as hereinafter further explained to permit discharge of any excess thermoplastic material from the distribution line 38 and thus release the build-up of pressure which might otherwise result.

A switch is provided adjacent each of the injection ports 64, 65 and 66, and each such switch is adapted to be closed by the plate 69 when the rod 68 reaches its fully lowered position. These switches, numbered 150, 151, and 152 are connected in series with each other and with the upper poles 146 of the switches 138. Thus, when all of these switches are closed, the solenoid 110 of valve 106 will be actuated to return the valve 106 to its first position wherein the pump 104 delivers pressurized fluid to the line 105. In addition, the closure of all of the switches 138, 150, 151, and 152 actuates the solenoids 122, 124 and 126 to open the valves 114, 115, and 116. Each of the lower poles 147 of switches 138 are independently connected to one of the solenoids 77, 79 or 81. Thus for example, the closing of switch 138 associated with chamber 46 will actuate the solenoid 81 of the appropriate valve 74 to direct the pressure from source 71 into the line 76 and thereby depress the piston 67 to close communication through line 50. From the above, it will be apparent that the valves 58, 59 and 60 are opened substantially simultaneously upon all of the accumulation chambers receiving a predetermined amount of the plastic mixture (disregarding any delay from the timers 143, 144 and 145), but these valves are independently closed upon the associated accumulation chamber being exhausted of its predetermined amount of the mixture. In this regard, it should be noted that all of the valves 114, 115, and 116 remain closed during the discharge of the plastic material from the accumulation chambers and until all of the accumulation chambers are exhausted and all of the ports 64, 65, and 66 are closed. This results from the fact that all of the switches 138 and the switches 150, 151, and 152 are connected in series, and it ensures that the proper charge will be injected through each of the ports. Also, the switches 150, 151, and 152 serve to terminate operation of the apparatus in the event one of the pistons 67 should stick in the raised position.

As noted above, there may be periods of time during the operation of the above apparatus wherein the pressure of the extruded material in the distribution line 38 will build above a desired level. This may often occur for example when all of the values 114, 115 and 116 are closed during the discharge of the mixture from the accumulation chambers into the mold. to relieve this pressure, there is provided a pressure release system which includes the preliminary accumulation chamber 39 and the dump valve 18. More particularly, the accumulation chamber 39 includes a floating piston 154 which is urged downwardly by a hydraulic pressure source 155 or the like at a pressure higher than that produced in the accumulation chambers 44, 45 and 46. Thus the mixture will not enter the chamber 39 when the lines to the accumulation chambers 44, 45 and 46 are open. When these lines are all closed however, the mixture will enter the accumulator 39, causing the piston 154 to lift until the upper poles 157 of the limit switch 158 are closed. Such closure actuates a solenoid 159 which controls the four-way air valve 160 to cause the control rod 162 to open the valve 18 such that the mixture exits through the spigot 163 into a suitable container (not shown) from the distribution line 38. The resulting drop in pressure within the line 38 causes the piston 154 of the accumulator 39 to drop, thereby closing the lower poles 164 and actuating the solenoid 165 to thereby again close the valve 18.

As an alternative to the above illustrated pressure release system, the pressure within the line 38 may also be controlled by an arrangement (not shown) wherein the limit switch 158 of the accumulator 39 would stop the operation of the hydraulic pump 17 and thus the extruder 12. When the pressure is released by the subsequent opening of the valves 114, 115 and 116, the hydraulic pump 17 would be reactuated to continue the extruding operation.

The operation of the illustrated apparatus will now be described in greater detail. With the extruder 12 operating in the conventional manner, the melted thermoplastic material is directed into the mixer 20 at a substantially uniform rate and at a relatively low pressure of, for example, about 500 psi. Nitrogen from the bottles 26, which maintain the gas at a pressure somewhat higher than about 500 psi, enters the mixer through the port 24 and is thoroughly mixed with the thermoplastic material as described above.

From the mixer 20, the mixture is directed into the distribution line 38 and through the lines 40, 41 and 42 to the three illustrated individual accumulating chambers 44, 45, and 46. Viewing FIG. 1, it will be observed that the valves 114, 115, and 116 are open and the accumulation chambers are being filled in the configuration shown, and that the switches 130 may be positioned at appropriate differing heights to control the charge collected in each accumulation chamber. For example, the switch 130 associated with accumulation chamber 45 is shown at a lower position than the remaining switches. Thus, this switch will close first as the pistons 84 are lifted by the entering mixture, and the closure thereof will actuate the associated solenoid 123 of valve 119 to direct the pressure from the source 71 into the appropriate line for closing the valve 115. Thus, this chamber can receive no more of the plastic mixture.

When all of the switches 130 are closed, the solenoid 111 is actuated to release the pressure in line 105, and the timer 134 will be actuated to energize the bell 142. After a short delay, the solenoids 78, 80 and 82 will be actuated in an order determined by the setting of the timers 143, 144 and 145. These solenoids cause the pistons 67 to lift to establish communication through lines 48, 49, and 50 to the mold 56, and since the solenoid 111 has caused the valve 106 to assume its second position for dumping the pressure in line 105, the pressure in areas 89 is released. The pistons 84 and 86 will thus be rapidly depressed by the high pressure in areas 88 from the first pressure means 90 to thereby rapidly force the mixture from each of the accumulation chambers into the mold. Also, it will be apparent from the above description that the release of the pressure in the areas 89 of the three accumulation chambers will be substantially concurrent, but the timers 143, 144, and 145 may be set so that there is a variation in the timing of the discharge from the three chambers.

This variation in timing may be helpful in filling a unitary relatively complex mold cavity such as shown at 62 in FIG. 1. Where the mixture enters the mold substantially concurrently from all of the ports, it may happen that the mixture entering from the port 66 will initially flow toward the left as shown in the drawing and occupy some of the area normally occupied by the material entering at port 65. Since the material from the port 65 cannot pass by the material which has entered from the port 66, the right hand end of the mold will remain unfilled, resulting in a void in the molded product. It has been found however that by timing the discharge through each of the ports it is possible to achieve a desired flow pattern of the material through the mold to ensure that all portions of the mold will be filled. Thus in the case of the mold cavity 62, it would be desirable to initially open the port 64, then the port 65, and finally the port 66. By this procedure, the material entering the port 64 will be assured of occupying its intended portion at the left end of the mold, and the material entering through the port 65 will similarly be assured of occupying its intended central portion. Since the material entering port 66 may not then flow toward the left, it will necessarily flow toward the right to fill the mold cavity.

To summarize the accumulation and discharge steps, the combined action of the first pressure means 90 and the opposing second pressure means 100 will exert a first downward force on the pistons 86 (and thus also pistons 84) sufficient to preclude foaming of the thermoplastic material as it accumulates within the chambers 44, 45 and 46. When the second pressure means 100 is released by the valve means, which includes the valve 106, a second downward force of greater intensity than the first force is applied to the pistons 86 and 84 to rapidly force the mixture from each chamber into the mold. The metering valves 127 may be employed in certain cases to adjust the speed at which the second pressure means 100 is released and thereby control the speed at which the mixture is forced into the mold. This speed control is often useful in further controlling the proper distribution of the charge within the mold.

When each of the pistons 84 reaches its predetermined lowered position, the lower poles 147 of the associated switch 138 will be closed to actuate the associated solenoid 77, 79 or 81 to direct the pressure from the source 71 through lines 76. The piston 67 of the appropriate valve 58, 59 or 60 will thus be lowered such that the rod 68 blocks communication between the mold and accumulation chamber.

When all of the pistons 84 reach bottom to close all of the poles 146 of the switches 138, and all of the rods 68 are fully lowered to close the switches 150, 151 and 152, the solenoid 110 will be actuated to reestablish pressure in the line 105 and thus in the area 89 beneath each of the pistons 86. Also, the solenoids 122, 124, and 126 will be actuated to open the valves 114, 115, and 116 and the apparatus will thus automatically recycle in the manner described above. Meanwhile, the mold may be opened and the part or parts removed.

In the drawings and specification, there has been set forth a preferred embodiment of the invention and although specific terms are employed, they are used in a generic and descriptive sense only and not for purposes of limitation. Also, while the disclosed embodiment shows three separate accumulation chambers, it will be understood that the novel features of the present invention will be applicable to an apparatus having one, two, or four or more such chambers.

That which is claimed is:

1. An apparatus for molding foamed thermoplastic articles comprising
    accumulation means including a plurality of expansible and contractible chambers for receiving a predetermined amount of a mixture of thermoplastic material and blowing agent therein,
    means for heating thermoplastic material and for mixing the thermoplastic material and a blowing agent and for conveying the resulting mixture under a first pressure sufficient to preclude the premature foaming thereof into each of said expansible and contractible chambers in said accumulation means,
    mold means connected to each of said chambers in said accumulation means for receiving the mixture of thermoplastic material and blowing agent from said accumulation means under conditions of reduced pressure to permit the foaming of the mixture received therein,
    means connected to said accumulation means for applying an expansion resisting pressure to each of said chambers during the receipt of the mixture therein to maintain the mixture under said first pressure in said chamber, and for applying a contracting pressure considerably higher than said expansion resisting pressure to said chamber to rapidly discharge the mixture from each of said chambers into said mold means, and
    means for selectively establishing and terminating communication between each of said chambers and said mold means and comprising an independent discharge line extending from each accumulation chamber and terminating in an injection port, means for establishing communication through each of said discharge lines in a variably timed predetermined sequence upon all of said accumulation chambers having received their predetermined amount of the mixture, and means for independently teminating communication through each of said discharge lines upon the associated accumulation chamber being exhausted of its predetermined amount of the mixture.

2. The apparatus as defined in claim 1 wherein said means for selectively establishing and terminating communication between each of said chambers and said mold means further comprises
    a value in each of said discharge lines,
    means operatively connected to each of said valves for opening the same, said opening means including independently adjustable timer means for controlling the sequence of establishing communication through said discharge lines, and
    means for actuating said opening means upon all of said chambers having received their predetermined amount of the mixture.

3. The apparatus as defined in claim 2 wherein said means for selectively establishing and terminating communication through each of said discharge lines further comprises
    means operatively connected to each of said valves for closing the same, and
    means for actuating each of said closing means upon the associated accumulation chamber being exhausted.

4. The apparatus as defined in claim 1 wherein said heating, mixing and conveying means comprises
    an independent entry line leading into each of said chambers, and
    means for selectively establishing communication through each of said entry lines during receipt of the mixture into the associated chamber and terminating communication through each of said entry lines upon the predetermined amount of the mixture being received in the associated chamber and during application of said contracting pressure to said chamber.

5. The apparatus as defined in claim 4 wherein said means for selectively establishing and terminating communication through each of said entry lines comprises
    an entry valve positioned in each of said entry lines,
    means for closing each of said entry valves upon the associated accumulation chamber being fully expanded, and
    means for opening all of said entry valves upon all of said accumulation chambers being exhausted and all of said discharge valves being closed.

6. An apparatus for molding foamed thermoplastic articles comprising
    accumulation means including a plurality of expansible and contractible chambers for receiving a predetermined amount of a mixture of thermoplastic material and blowing agent therein, means for heating thermoplastic material and for mixing the thermoplastic material and a blowing agent, means for conveying the resulting mixture under a first pressure sufficient to preclude the premature foaming thereof into each of said expansible and contractible chambers in said accumulation means, and including a manifold operatively connected to said heating and mixing means, and an independent entry line leading into each of said chambers from said manifold, mold means connected to each of said chambers in said accumulation means for receiving the mixture of thermoplastic material and blowing agent from said accumulation means under conditions of reduced pressure to permit the foaming of the mixture received therein, means connected to said accumulation means for applying an expansion resisting pressure to each of said chambers during the receipt of the mixture therein to maintain the mixture under said first pressure in said chamber, and for applying a contracting pressure considerably higher than said expansion resisting pressure to said chamber to rapidly discharge the mixture from each of said chambers into said mold means, and valve means in each of said entry lines for selectively establishing communication through each of said entry lines during receipt of the mixture into the associated chamber and for terminating communication through each of said lines upon the predetermined amount of the mixture being received in the associated chamber and during application of said contracting pressure to such chamber.

7. The apparatus as defined in claim 6 wherein each of said expansible and contractible chambers includes a piston translatable between a first position defining an unexpanded chamber and a second position defining an expanded chamber, and said means for selectively establishing and terminating communication through each of said entry lines includes a valve in each of said entry lines, and means operatively connected to each of said chambers for closing the associated valve when the associated piston reaches its second position.

8. The apparatus as defined in claim 7 wherein said means for selectively establishing and terminating communication through each of said entry lines further includes means operatively connected to each of said chambers for opening the associated valve when all of said pistons reach their first position.

9. The apparatus as defined in claim 8 further including means for independently adjusting said second position of each of said pistons whereby the volume of the mixture adapted to be received in each of said chambers may be independently varied.

10. An apparatus for molding foamed thermoplastic articles comprising means for melting and mixing a thermoplastic material and a blowing agent and conveying the resulting mixture along a path of travel under sufficient pressure to preclude foaming of the same, an accumulation chamber communicating with said path of travel for receiving said mixture and including a first piston translatable between a lowered position defining an unexpanded chamber and a raised position defining an expanded chamber, a cylindrical piston housing mounted adjacent said accumulation chamber, a second piston translatably carried within said housing and being fixedly connected to said first piston so as to be translatable therewith, said second piston and housing defining a first area above said second piston and a second area beneath said second piston, first pressure means communicating with said first area for urging said first and second pistons downwardly, second pressure means of a value less than said first pressure means and communicating with said second area for urging said first and second pistons upwardly, valve means for selectively maintaining said second pressure means to apply a first force on said first and second pistons adapted to maintain a pressure in said chamber sufficient to preclude foaming of the mixture received therein, and releasing said second pressure means to apply a second force of greater intensity than said first force on said first and second pistons, mold means for receiving the mixture from said accumulation chamber and permitting the foaming of the mixture received therein, means for establishing selective communication between said accumulation chamber and said mold means, and control means for substantially concurrently actuating said valve means to release said second pressure means and said means for establishing communication between said accumulation chamber and said mold means such that the accumulated mixture may be rapidly forced from the accumulation chamber into the mold means by said second force acting on said first and second pistons.

11. The apparatus as defined in claim 10 wherein said second pressure means includes a hydraulic line operatively connected to said second area, and hydraulic pump means for supplying pressurized hydraulic fluid in said hydraulic line, and said valve means includes a valve positioned in said hydraulic line and adapted to selectively release the pressurized hydraulic fluid therefrom.

12. The apparatus as defined in claim 11 further including a manually adjustable metering valve positioned in said hydraulic line to permit adjustment of the speed at which said second pressure means is released by said valve means and thus the speed at which the accumulated mixture is forced into the mold means.

13. An apparatus for molding foamed thermoplastic articles comprising means for melting a thermoplastic material and conveying the melted material under pressure along a path of travel, mixing means positioned in said path of travel for receiving the pressurized melted thermoplastic material and thoroughly mixing a gaseous blowing agent therewith while maintaining the mixture under sufficient pressure to preclude the foaming thereof, a plurality of expandable accumulation chambers communicating with said path of travel for receiving the pressurized mixture from said mixing means, each of said chambers including a translatable piston, mold means for receiving the mixture from said accumulation chambers under conditions of reduced pressure to permit the foaming of the mixture received therein, means for establishing communication between each of said accumulation chambers and said mold means upon all of said accumulation chambers receiving a predetermined amount of the mixture, and means for applying a first force on each of said pistons to maintain the mixture received in said chambers under a pressure sufficient to preclude foaming thereof and for selectively applying a second force of greater intensity than said first force on each of said pistons substantially concurrently with communication being established between said accumulation chambers and mold means to rapidly force the mixture from each of said accumulation chambers into said mold means 14. An apparatus for molding foamed thermoplastic articles comprising extruder means for melting a thermoplastic material and conveying the same along a path of travel, mixing means positioned in said path of travel for receiving the melted thermoplastic material and thoroughly mixing a gaseous blowing agent therewith, said mixing means comprising a tubular wall defining a cylindrical internal pasageway, port means extending passageway, said wall for admitting the gaseous blowing agent therethrough, and auger means fixedly positioned in said passageway for directing a first portion of the melted material along a helical path and a second portion of the material along a linear path which intersects said helical path, and mold means for receiving the mixed thermoplastic material and blowing agent and permitting the same to expand into a predetermined configuration.

15. The apparatus as defined in claim 14 wherein said auger means comprises a central shaft coaxially disposed in said passageway, and a flange helically disposed about said shaft and having a major diameter less than the internal diameter of said passageway to define a clearance between the periphery of said flange and said wall.

16. The apparatus as defined in claim 15 wherein said helically disposed flange includes a first portion of one hand, and a second portion of the opposite hand.

* * * * *

UNITED STATES PATENT OFFICE
CERTIFICATE OF CORRECTION

PATENT NO. : 3,891,362
DATED : June 24, 1975
INVENTOR(S) : William R. DeVita

It is certified that error appears in the above-identified patent and that said Letters Patent are hereby corrected as shown below:

Column 2, Line 25, change "botaining" to --obtaining--;
Column 2, Line 46, change "high" to --highly--;
Column 4, Line 27, change "38" to --28--;

Column 6, Line 15, change "187" to --87--;
Column 6, Line 19, after "of", insert --the--;
Column 7, Line 13, change "tha" to --the--;
Column 7, Line 26, change "values" to --valves--;
Column 7, Line 28, change "to" to --To--;
Column 8, Line 5, change "accumulating" to --accumulation--;
Column 8, Line 27, after "through", insert --the--;

IN THE CLAIMS:

Column 10, Line 15, change "teminating" to --terminating--;
Column 10, Line 24, change "value" to --valve--;
Column 13, Line 19, after "means", insert --.--.

Signed and Sealed this fourteenth Day of October 1975

[SEAL]

Attest:

RUTH C. MASON
*Attesting Officer*

C. MARSHALL DANN
*Commissioner of Patents and Trademarks*